United States Patent [19]

Gavin

[11] 4,085,914
[45] Apr. 25, 1978

[54] DYNAMOELECTRIC MACHINE MOUNTING ASSEMBLY

[75] Inventor: John J. Gavin, Schenectady, N.Y.

[73] Assignee: General Electric Company, Schenectady, N.Y.

[21] Appl. No.: 665,351

[22] Filed: Mar. 9, 1976

[51] Int. Cl.² ............................................. F16M 5/00
[52] U.S. Cl. .................................................. 248/19
[58] Field of Search ..................... 248/19, 23, 25, 14, 248/16; 310/91

[56] References Cited

U.S. PATENT DOCUMENTS

| 1,840,741 | 1/1932 | Reid ....................................... 248/19 |
| 3,190,041 | 6/1965 | Kimball .............................. 248/19 X |
| 3,799,461 | 3/1974 | Skeen et al. ....................... 248/19 X |
| 3,851,607 | 12/1974 | August et al. .......................... 248/19 |
| 3,937,433 | 2/1976 | Portaleoni .............................. 248/19 |

FOREIGN PATENT DOCUMENTS

| 215,011 | 5/1961 | Austria ................................... 248/19 |
| 121,199 | 2/1931 | Austria ................................... 310/91 |
| 1,321,243 | 2/1963 | France ................................... 248/14 |
| 425,490 | 2/1926 | Germany .............................. 248/19 |
| 2,210,038 | 9/1972 | Germany .............................. 248/23 |

Primary Examiner—Roy D. Frazier
Assistant Examiner—Robert W. Gibson, Jr.
Attorney, Agent, or Firm—Vale P. Myles

[57] ABSTRACT

A dynamoelectric machine mounting assembly characterized by having a vertically movable wedge bar that is slidably mounted between one end of a dynamoelectric machine pedestal and a beveled cam block that is welded in a fixed position on a metal foundation soleplate that supports the machine. The wedge bar is driven downward against the beveled cam surface by a plurality of bolts inserted through the wedge bar and threaded into the soleplate. Such downward movement of the wedge bar compresses it between the cam block and the machine pedestal to stress-load the wedge bar and rigidly fix the machine in position on the soleplate so that the machine does not move in an axial direction when thrust loads are applied to it along its drive shaft axis.

5 Claims, 3 Drawing Figures

DYNAMOELECTRIC MACHINE MOUNTING ASSEMBLY

BACKGROUND OF THE INVENTION

It is common practice to mount large dynamoelectric machines on concrete foundations that are covered with a flat metal soleplate that affords a smooth mounting surface for the machine. To prevent the machine from moving axially on such a smooth soleplate, in response to axial drive or mounting thrusts being applied to the machine, it is conventional practice to secure holding blocks to the soleplate in abutting relationship with opposite ends of the machine pedestals. The holding blocks are ordinarily fixed in position by inserting a number of metal dowels through them and the soleplate. The thrust loading anticipated on the motor pedestal will determine the number of dowels needed in a given application to prevent the dowels from being sheared off. Finally, in order to have as little play as possible between the holding blocks and the machine pedestals, a plurality of shims are typically mounted between these component parts in an attempt to substantially eliminate all slack in the mounting assembly.

These conventional prior art mounting assemblies have several shortcomings. One of these shortcomings is that a relatively large amount of space is frequently needed to accommodate sufficiently large holding plates to receive all of the dowels necessary to accommodate the shear forces encountered with dynamoelectric machines that are subject to large axial thrusts. For example, holding plates of a foot or more in width would be necessary to receive the large number of dowels necessary to resist the axial thrusts of several hundred thousand pounds that are often encountered on modern day large dynamoelectric machines. The provision of such additional space frequently is not a desirable design requirement in powerhouse and industrial applications where space is at a premium.

Another shortcoming of such prior art mounting assemblies is that it is not possible with the shim arrangements utilized therein to completely eliminate slack in the mounting assemblies. Accordingly, when axial thrust loads are alternately applied to a machine pedestal secured by such an assembly this slack allows the machine to shift on the foundation soleplate thus causing a hammering effect that tends to render the mounting assembly ineffective over a period of time.

SUMMARY OF THE INVENTION

A primary object of the present invention is to provide a dynamoelectric machine mounting assembly that overcomes the above-mentioned shortcomings of related prior art assemblies.

Another object of the invention is to provide a dynamoelectric machine mounting assembly that requires relatively little space, compared with prior art assemblies, to accommodate the means utilized to rigidly fix a machine pedestal in position on a foundation soleplate.

Yet another object of the invention is to provide a mounting assembly that utilizes a stress-loaded wedge bar to accurately fix a dynamoelectric machine pedestal in position so that the pedestal cannot slide and hammer the holding blocks of the assembly responsive to the application of axial thrust forces on the pedestal.

Additional objects and advantages of the invention will be apparent to those skilled in the art from the description of the invention presented herein taken in connection with the accompanying drawings.

In one preferred embodiment of the invention a dynamoelectric machine mounting assembly is formed by welding metal holding blocks to a foundation soleplate adjacent the opposite sides of a dynamoelectric machine pedestal positioned on the soleplate. A cam block having a beveled cam surface thereon is also welded to the soleplate between one end of the machine pedestal and the holding blocks, in abutting relationship with the holding block. A vertically movable wedge bar is positioned between the cam block and the machine pedestal, and a plurality of threaded bolts are inserted through apertures in the wedge block and into threaded apertures in the soleplate for applying a downward force on the wedge bar. When forced downward into engagement with the beveled cam surface on the cam block, the wedge bar is compressed between the cam block and the machine pedestal thereby enabling the wedge bar to force the machine pedestal into contact with the other holding block. In operation, the wedge bar is compressed to apply a pre-determined stress loading to it that is effective to fix the machine pedestal in position without permitting any slack to exist in the mounting assembly. In an alternative embodiment of the invention, a plurality of shims are positioned between the machine pedestal and the wedge bar before it is moved downward into its compressed position. In yet another embodiment, a substantially identical wedge bar and cam block are also mounted between the other end of the machine pedestal and the holding block adjacent thereto.

DESCRIPTION OF THE PREFERRED EMBODIMENT

Figure 1:
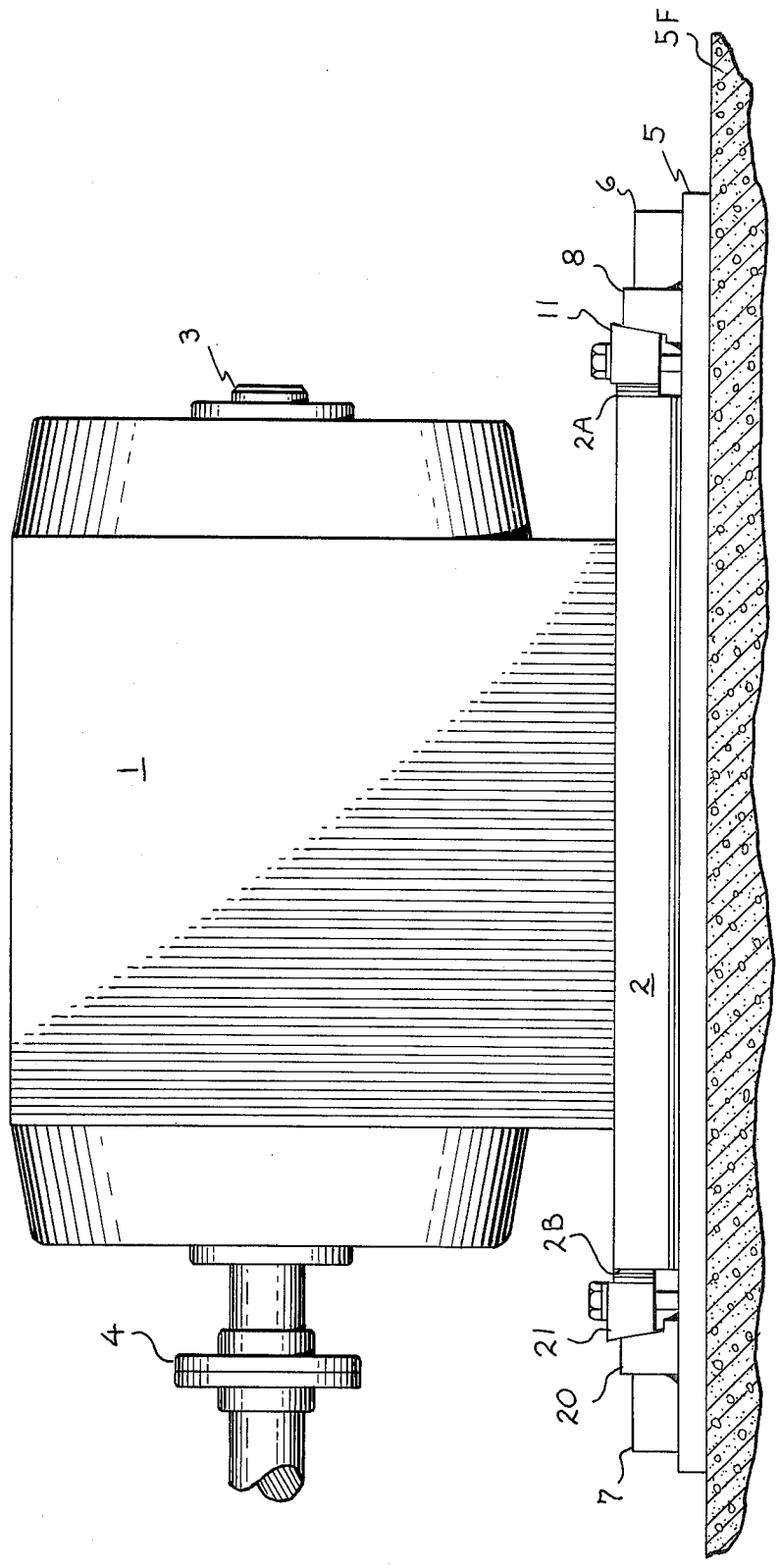
FIG. 1 is a side elevation view of a dynamoelectric machine mounted on a foundation with a mounting assembly constructed pursuant to the present invention.

Referring first to FIG. 1 of the drawing, it will be seen that there is shown a dynamoelectric machine 1 having a mounting pedestal 2 that may be of any conventional form, but in this embodiment of the invention the pedestal 2 comprises a housing formed of steel structural ribs and steel plate supported thereon. Insofar as the construction of the pedestal 2 is particularly significant to understanding the mounting assembly of the present invention, it need only be recognized that the pedestal 2 is machined to form two substantially parallel planar sides 2A and 2B at opposite ends thereof transverse to the longitudinal axis of its drive shaft 3.

In the illustrated embodiment of the invention, the dynamoelectric machine 1 is shown mounted with its drive shaft in a substantially horizontal position, and a coupling 4 is depicted to indicate that the machine 1 could readily be connected to a second machine or drive output. It should be understood that the mounting assembly of the present invention is suitable for use in fixing a dynamoelectric machine in position on either a horizontal mounting pedestal or on a mounting pedestal that supports the machine at a pre-determined angle relative to a horizontal plane. In fact, it is in such sloped mounting arrangements, which are being used in present day powerhouse installations of motors and motor generator sets, that the subject invention finds advantageous utility due to its ability to counteract any hammering effect that might be built up if a prior art mounting assembly were to be used.

As seen in FIG. 1, and as is conventional in the installation of large dynamoelectric machines, the machine 1 is positioned on a concrete foundation 5F that has a steel foundation soleplate 5 disposed on its upper surface. Typically such steel soleplates are from ½ inch to 1½ inch thick and preferably are just large enough to accommodate the machine pedestal and mounting assembly with which they are used. Because the machine 1 is to be slidably disposed on the upper surface of the soleplate 5, that upper surface is formed to be relatively flat, as shown. Normally, irregularities between the flat upper surface of the soleplate 5 and the generally flat bottom of the machine pedestal 2 are compensated for by inserting shims therebetween when the machine is initially mounted on the soleplate. As mounted in this position, the planar sides 2A and 2B of the pedestal 2 are perpendicular to the flat surface of the soleplate 5. It is also common practice to spread grouting material between the foundation 4 and the bottom of soleplate 5 to further insure a desired degree of rigidity of the mounting assembly for machine 1.

First and second holding blocks 6 and 7 are welded to the upper surface of the foundation soleplate, respectively, on opposite sides of the pedestal 2, adjacent to but spaced from the planar sides 2A and 2B, as shown in FIG. 1. In the preferred embodiment of the invention the holding blocks 6 and 7 are actually parts of two sets of substantially identical holding blocks. One of such sets of holding blocks 6, 6' and 6" being shown in FIG. 2. However, it will be understood that in some applications of the invention a single pair of holding blocks 6 and 7 may be used if the blocks are appropriately positioned at the mid-point of the pedestal 2. An embodiment of the invention using two sets of several holding blocks each will be further described below.

Figure 2:
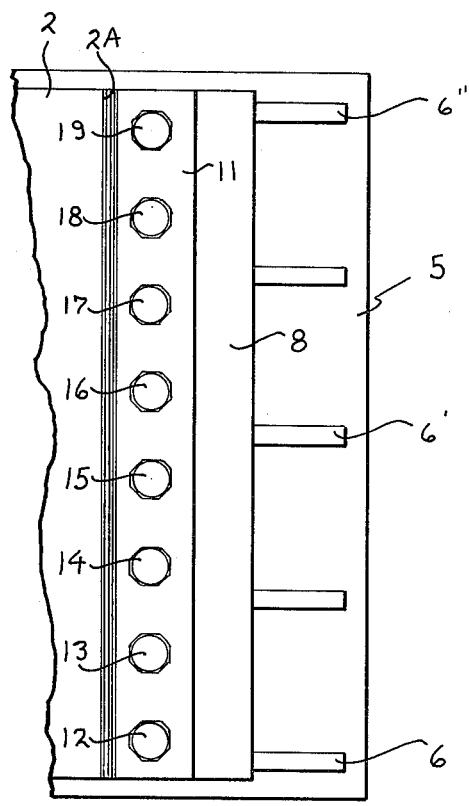
FIG. 2 is a fragmentary, top plan view of one end of the mounting assembly shown in FIG. 1.
Figure 3:
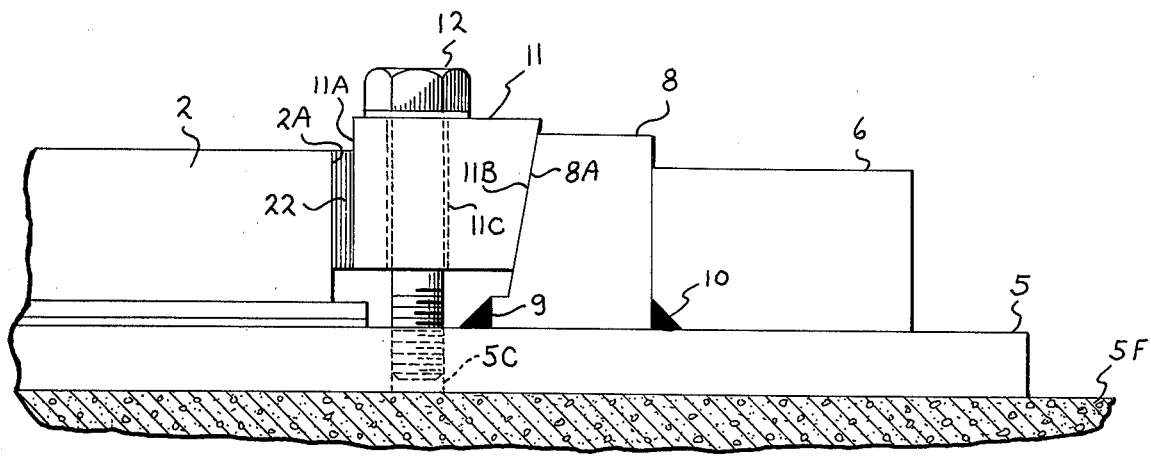
FIG. 3 is an enlarged, fragmentary, side elevation view of the portion of the mounting assembly shown in FIG. 2.

The mounting assembly of the invention further comprises at least one cam block 8, also shown in FIGS. 2 and 3. The cam block 8 is welded to the upper surface of soleplate 5 by fillet welds, such as the welds 9 and 10 shown in FIG. 3. Other suitable welds, such as J welds could, of course, be employed. As also best seen in FIG. 3, the cam block is supported in abutting relationship with one of the holding blocks 6 (which would be placed at the center of the cam block like block 6', rather than at one end thereof, as shown in FIGS. 2 and 3) between it and the pedestal 2.

The cam block 8 is oblong in configuration and has a cam surface 8A beveled at an angle in the range of 65 to 85 degrees relative to the flat upper surface of soleplate 5, to provide a desired camming or wedging action of the assembly that will be described below. Actually, in the preferred embodiment of the invention the cam surface 8A is beveled at an angle of approximately 80° relative to the upper surface of soleplate 5 to afford optimum camming action, for the preferred embodiment which utilizes machined and lubricated steel at the camming surfaces (8A-11C).

An elongated wedge bar 11 (See FIGS. 2 and 3) is positioned between the cam block 8 and pedestal 2, and has a planar surface 11A juxtaposed with the nearest planar side 2A of the pedestal 2. The wedge bar 11 also has a beveled surface 11B that is formed to cooperate with the beveled surface 8A of cam block 8, as shown in FIG. 3. The beveled suface 11B of wedge bar 11 is positioned in sliding relationship on the cam surface 8A when the mounting assembly is complete, as shown in FIG. 3.

In order to provide means for drawing the wedge bar 11 downward between the cam block 8 and the pedestal 2, a plurality of first wall means 11C that define a plurality of spaced apertures extending through the wedge bar 11 from the top to the bottom surface thereof are provided by drilling, boring or otherwise shaping the wedge bar 11. Similarly, a cooperating set of second wall means 5A define a plurality of threaded apertures, as best seen in FIG. 3, that extend through the upper surface of the foundation soleplate 5 into or through the body thereof. Threadably mounted in these apertures are a plurality of threaded bolts 12 through 19, which are positioned respectively through one of the apertures 11C, etc., in the wedge bar 11 and into threaded engagement with one of the apertures 5A, etc. in the soleplate 5. It will be understood that the bolts 12-19 are operable, responsive to rotation thereof that forces their heads against the top of the wedge bar 11, to drive the beveled surface 11B of the wedge bar against the beveled cam surface 8A thereby to position one planar surface (2B) of the pedestal in driving relationship against the other holding block 7. It should be understood at this point that the pedestal 2 may be driven into direct engagement with either the holding block 7 or, alternatively, a second substantially identical cam block 20 and wedge bar 21, as illustrated in FIG. 1, may be disposed between the holding block 7 and the planar side 2B of pedestal 2. If such an additional wedge bar and cam block are utilized, they will function in substantially the same manner as the cam block 8 and wedge bar 11 illustrated in FIGS. 2 and 3, insofar as the stress-loading of the second wedge bar is concerned.

Thus, referring to FIG. 3, it will be seen that when the wedge bar 11 is driven downward by the bolts 12-19 a pre-determined stress-load can be applied to the wedge bar 11 by compressing it between the pedestal 2 and the cam block 8. Pursuant to the teaching of the invention, the wedge bar 8 is stress-loaded sufficiently to make it effective to retain the pedestal in a fixed position when the pedestal 2 is subjected to thrust loading along an axis transverse to the planar sides 2A and 2B thereof. As mentioned above, some thrust loading of the mounting assembly is encountered in mounting applications where the machine 1 is mounted in a sloped position on the foundation 4, but similar irregular thrust loads will be applied due to the drive couplings to which the machine 1 may be subjected in normal operation.

By way of example, for a large generator it is possible that the thrust loading along the longitudinal axis of drive shaft 3 may vary widely, for example, over a range of 100,000 to 1,600,000 pounds. In such a case, to properly practice the present invention, the bolts 12 would be rotated in the threaded apertures 5A sufficiently to stress-load the wedge bar 8 to exert thereon a compressive force of 10,000 pounds per square inch, or more.

While the foregoing description of a preferred embodiment of the invention will enable those skilled in the art to practice the subject invention, some modifications and improvements of the basic invention will be described now. It has been found that although the beveled surfaces on cam block 8 and wedge block 11 can be formed to provide a considerable range of lateral movement for the wedge bar 11 as it is drawn downward by bolts 12–19, it is sometimes preferable to utilize a plurality of flat shims 22 positioned between the wedge bar 11 and the planar surface 2A on pedestal 2 prior to the application of compressive pressure to the wedge bar. The use of the shims 22 makes it possible to place a major portion of the beveled surface 11B in sliding engagement with the beveled cam surface 8A when a compressive force is first applied to the wedge bar 11. It has also been found that by lubricating the respective shims 22 the desired pre-determined compressive stress-loading can be applied to the wedge block 11 with a smaller downward pressure being exerted by bolts 12 than would be required if the surface 11A on which block 11 had to be forced downward in frictional engagement with planar surface 2A of pedestal 2.

A further modification of the invention that has been found to be particularly desirable is to provide each of the apertures 11C, etc. through wedge bar 11 with a diameter in the range of $\frac{1}{8}$ to $\frac{1}{2}$ inch greater than the diameter of the respective bolt shanks 12–19 extending therethrough. This range of relatively larger diameters allows the wedge block 11 to shift laterally relative to the vertical axes of the bolts 12–19 as the bar 11 is forced downward, thus, a bending torque is not applied to the bolts by the sidewalls of apertures 11C of the wedge block. An advantage of this particular arrangement is that it makes it possible to more accurately measure the torque force applied to the heads of the bolts 12–19, relative to the compressive force exerted on the wedge block 11, due to the absence of any frictional drag between the sidewalls of the apertures 11C and the bolt shanks.

As mentioned above, in a preferred embodiment of the invention, a second wedge bar 20 and cam block 21, substantially identical in configuration and operation to the first wedge bar 11 and cam block 8, described above in detail, can be positioned between the other holding block 7 and the second planar side 2B of pedestal 2. An advantage of such an arrangement is that it enables the machine 1 to be accurately positioned on the soleplate 5 by moving it in either longitudinal direction relative to the drive shaft 3 by appropriately adjusting the respective positions of the two wedge bars 11 and 20 to shift the machine 1 toward either the right or left ends of the soleplate 5.

Also, as briefly mentioned above, in the most preferred embodiment of the invention, rather than using a single pair of holding blocks 6 and 7, the mounting assembly could include two sets of additional holding blocks. One set being similar to the set 6, 6′ and 6″ shown in FIG. 2, and the other, matching set 7, 7′, 7″ (not shown) in such an assembly being welded to the foundation 5 in abutting relationship with the second cam block 20. Each holding block (6, 6′, 6″, etc.) of the first set would be welded to the foundation soleplate in abutting relationship with the first cam block 8, as shown in FIG. 1. The use of such sets of plural holding blocks is particularly recommended in applications where space limitations on the soleplate are relatively strict. In such applications the use of plural holding blocks arranged in a buttressing relationship to the cam blocks 8 and 20, as shown in FIGS. 1 and 2, enables the length of welds securing these blocks in position to be increased, insofar as the welds can thus be formed down both sides of the blocks and across there back ends. In essence, this increased length of welding surface serves to increase the length of fillet welds 9 and 10 extending along the edges of the cam blocks 8 and 20 so that the overall strength of these combined welds enables the cam blocks 8 and 20 to absorb a large compressive force exerted on them by the pre-loading of wedge bars 11 and 21 pursuant to the practice of the present invention.

Finally, as best seen in FIG. 2, in the preferred embodiment of the invention, as it is useful with large dynamoelectric machines that are forced to use only a relatively confined space on an associated foundation soleplate, it is desirable to form the beveled surfaces of the wedge bars 11 and 21 and of the cam blocks 8 and 20 so they are each approximately equal in length to the length of the planar sides 2A and 2B of the machine pedestal 2 with which they are designed to cooperate. These relative dimensions enable the compressive force exerted on the wedge bars to be uniformly distributed over relatively long fastening welds on the cam blocks 8 and 20 and their abutting holding block or blocks, as described above.

It will be apparent to those skilled in the art that various further modifications and improvements of the invention may be developed from the description of it presented herein. Accordingly, it is my intention to define by the following claims the true spirit and scope of the invention.

What I claim and desire to secure by Letters Patent of the United States is:

1. A dynamoelectric machine mounting assembly comprising a foundation soleplate having a flat upper surface, a dynamoelectric machine having a mounting pedestal with two substantially parallel planar sides, said pedestal being slidably disposed on said upper surface of said plate, first and second holding blocks welded to the upper surface of the foundation soleplate each, respectively, on opposite sides of said pedestal adjacent one of said planar sides, at least one cam block welded to said upper surface in abutting relationship with one of said holding blocks, between it and said pedestal, said cam block having a cam surface beveled at an angle in the range of 65° to 85° relative to said flat upper surface, a wedge bar positioned between the cam block and said pedestal, said wedge bar having a planar surface juxtaposed with the nearest planar side of said pedestal and having a beveled surface positioned in sliding relationship on the beveled cam surface of said cam block, the beveled surfaces of said wedge bar and cam block being approximately equal in length to the length of the planar side of the pedestal adjacent thereto, first wall means defining a plurality of spaced apertures extending through the wedge bar from the top to the bottom surface thereof, second wall means defining a plurality of threaded apertures extending through the upper surface of said foundation soleplate into the body thereof, and a plurality of threaded bolts each positioned, respectively, through one of the apertures in said wedge bar and into threaded engagement with one of the apertures in said sole plate, said bolts being operable, responsive to rotation thereof that forces their heads against the top of the wedge bar, to drive the beveled surface of the wedge bar against said beveled cam surface thereby to position one planar surface of the pedestal against the other holding block and to stress-load the wedge bar by compressing it between the pedestal and the cam block, said stress-loaded wedge bar being effective to retain the pedestal in a fixed position when the pedestal is subjected to thrust loading along an axis transverse to the planar sides thereof.

2. An assembly as defined in claim 1 including a plurality of shims positioned between the planar surface of said wedge bar and the planar side of the pedestal in juxtaposition and inextensive in length therewith.

3. An assembly as defined in claim 2 wherein each of said apertures through the wedge bar has a diameter in the range of ⅛ to ½ inch greater than the diameter of the bolt shank extending therethrough.

4. An assembly as defined in claim 3 including a second wedge bar and cam block substantially identical in configuration and operation to the first wedge bar and cam block, but positioned between said other holding block and the other planar side of the pedestal.

5. An assembly as defined in claim 4 including two sets of additional holding blocks each holding block in one set being welded to the foundation soleplate in abutting relationship with one of said cam blocks and each holding block of the other set being welded to the foundation soleplate in abutting relationship with the other of said cam blocks.

* * * * *